May 29, 1956  E. A. HOSMER  2,748,373
TELEMETERING SYSTEM FOR REMOTE INDICATION
Filed Sept. 2, 1952  2 Sheets-Sheet 1
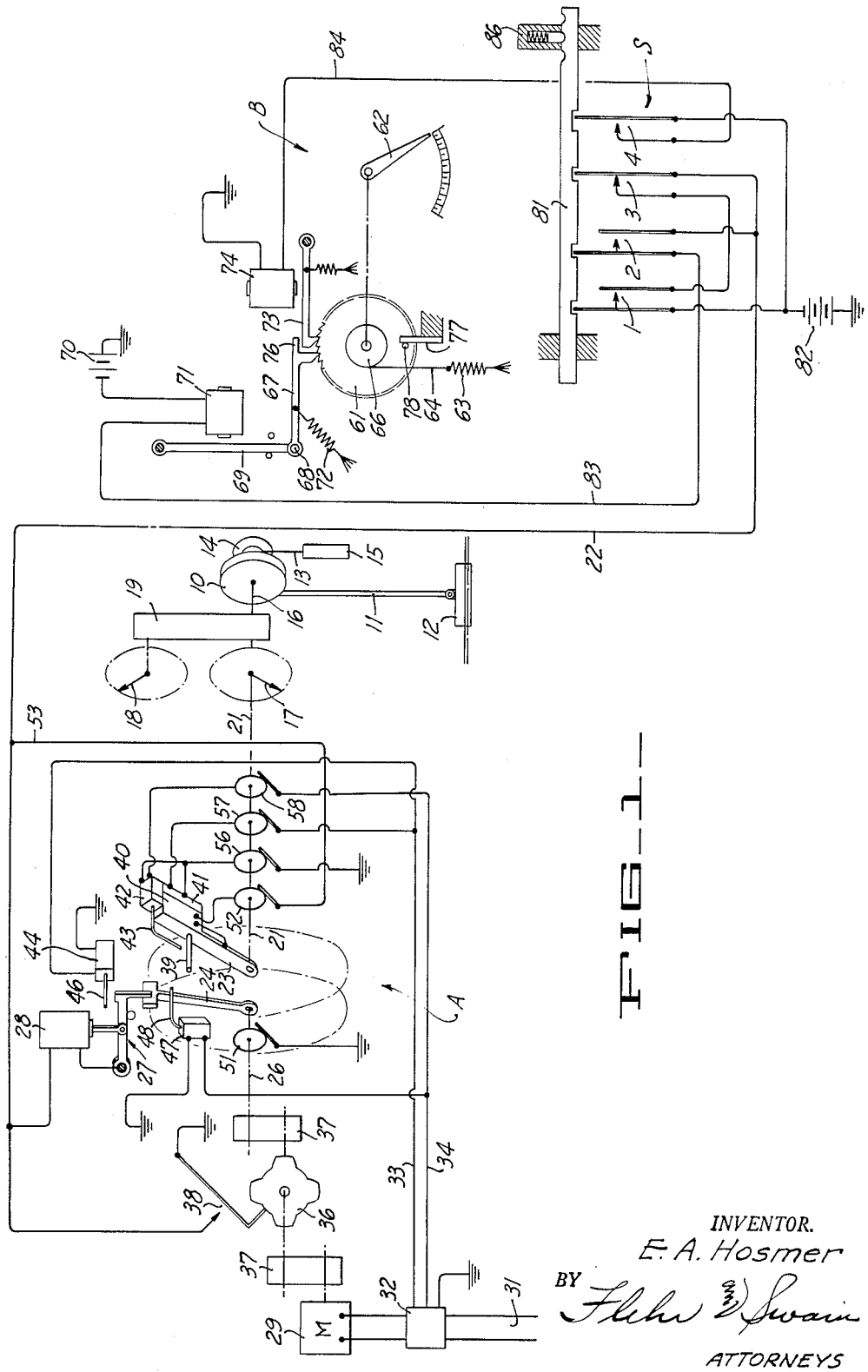
INVENTOR.
E. A. Hosmer
BY
ATTORNEYS

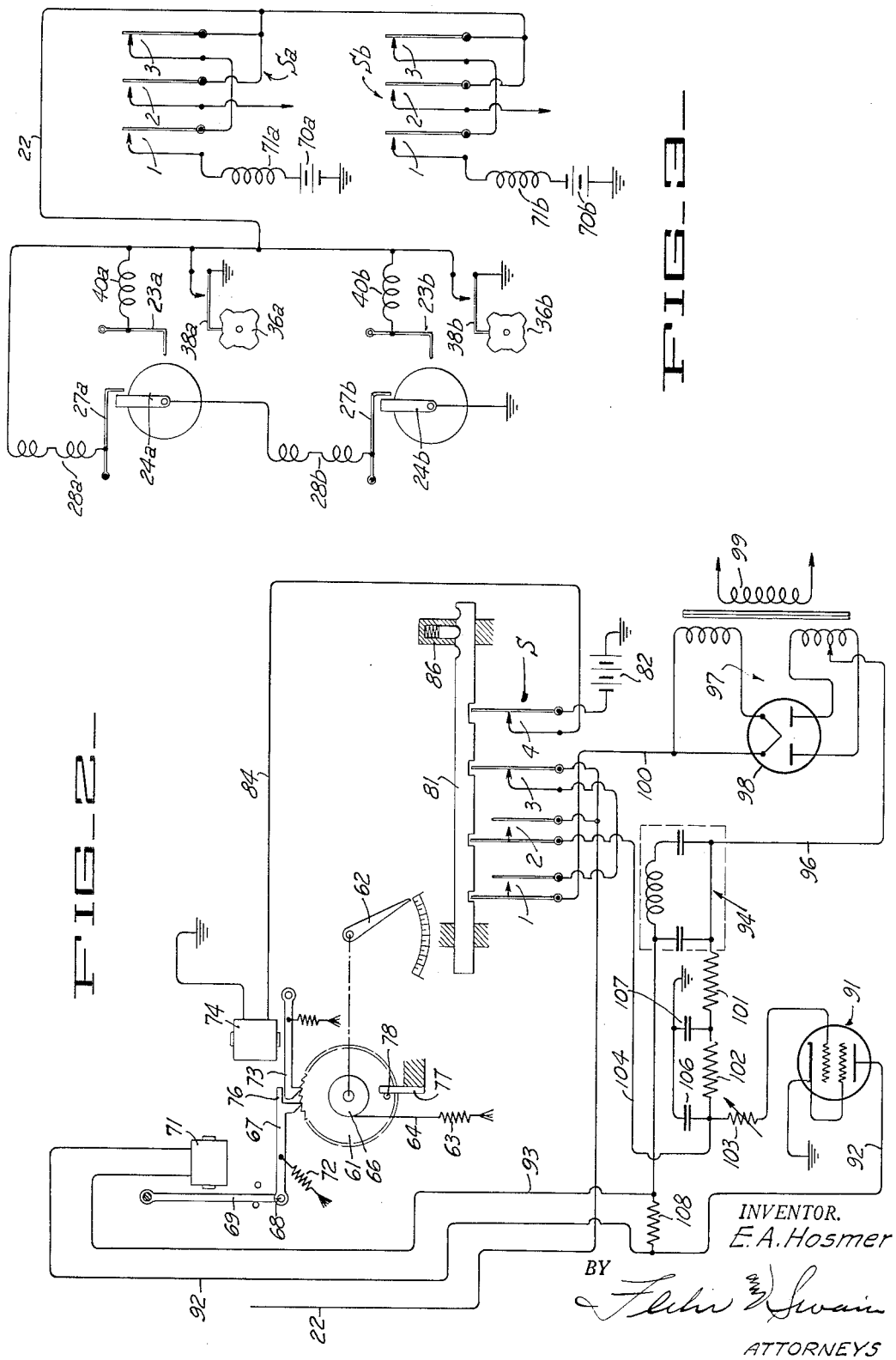

United States Patent Office 2,748,373
Patented May 29, 1956

2,748,373

TELEMETERING SYSTEM FOR REMOTE INDICATION

Ellsworth A. Hosmer, Kenwood, Calif., assignor, by mesne assignments, to Shand and Jurs Company, Berkeley, Calif., a corporation of California Application September 2, 1952, Serial No. 307,444

2 Claims. (Cl. 340—151)

This invention relates generally to remote reading indicating systems of the telemetering type, and particularly to systems for remote gauging of tanks or like liquid storage reservoirs.

In the past it has been common practice to gauge the liquid level in tanks by means of a float which is attached to a suitable indicating means. The indicating means may for example be of the type disclosed in Patent No. 2,144,113 wherein an extended metal gauging tape is wound upon a takeup reel, and is attached to the float. In many instances it is desirable to secure a level indication at a point remote from the tank. Electrical means of the Selsyn motor type has been developed for this purpose, but has been subject to certain disadvantages. Particularly such systems require a large number of connecting wires between the tank and indicating stations, which increase the cost of installation and maintenance. Also such systems are relatively complicated and expensive, due to the use of Selsyn motors and the complicated circuits involved. In instances where it is desired to provide one reading station for a plurality of remote tanks, a Selsyn system becomes increasingly complicated and expensive.

It is an object of the present invention to provide an electrical telemetering system for remote indication which is characterized by its simplicity, particularly with respect to the character of wiring involved between the sending and reading or receiving stations.

Another object of the invention is to provide a system of the above character having novel means at the reading station which can be operated to secure a reading of liquid level in a tank at the sending station, without making use of Selsyn motors or like complicated and expensive devices.

Another object of the invention is to provide an electrical telemetering system of the above character which makes use of novel pulse operated means to secure accurate operation of indicating means at the reading station.

Another object of the invention is to provide a system of the above character having novel means for initiating operation of the pulse generating means.

Additional objects and features of the invention will appear from the following description in which the preferred embodiment has been set forth in detail in conjunction with the accompanying drawing.

Referring to the drawing:

Figure 1 is a schematic view illustrating a gauging system incorporating the present invention, and indicating the electrical wiring.

Figure 2 is a schematic view illustrating a modification of Figure 1 in which amplifying means is employed.

Figure 3 is a schematic view illustrating another embodiment of the invention, utilizing polarized pulses.

The invention illustrated schematically in Figure 1 consists of a reel 10, upon which is wound the gauging tape or like elongated element 11. The tape is attached to the float 12, which is located within a tank, and which raises or lowers in accordance with the level of liquid in the tank. The reel 10 is also provided with suitable counter torque means, such as the cord 13 which is wound upon the drum 14 and attached to the weight 15. The counter weight applies torque to the reel whereby the tape 11 is tensioned at all times. As is well known to those familiar with liquid level indicating equipment, the reel 10 is rotated responsive to raising or lowering of the float, and its angular position at any one time serves to indicate the liquid level. As illustrative of visual indicating means, the reel is shown mounted upon shaft 16, and this shaft operates the pointers 17 and 18 through the gear reduction 19. The gear reduction may be such that pointer 17 indicates feet, while pointer 18 indicates inches. It is assumed that pointer 17 makes substantially one revolution for the entire gauging range.

In accordance with the present invention, the shaft 21 which carries the pointer 17 is connected with the apparatus designated generally at A, and which in turn is electrically connected to the apparatus designated generally at B, located at a remote reading station. The only connection between these stations is the single wire 22.

The apparatus A at the tank station consists of an arm 23, attached to the shaft 21, and a follower arm 24 attached to the shaft 26. The shafts 26 and 21 are preferably aligned as illustrated. Arm 24 is normally held by latch 27 in the starting position illustrated in Figure 1. The latch is adapted to be operated by energizing the solenoid 28.

Motive means for the shaft 26 consists of an electric motor 29, driven from the power supply lines 31, through the start-stop box 32. The start and stop circuits of the box 32 are connected to lines 33 and 34, which when grounded through start and stop switches, serve to start or stop the motor. The motor drives the pulsing wheel 36 through the gear reduction 37. Also it drives the shaft 26 through gear reduction 37. The arrangement is such that for one complete revolution of the arm 24, the pulsing wheel 36 is rotated a predetermined number of times. Contacts 38 are adapted to be periodically closed by rotation of the pulsing wheel, and as will be presently explained the pulses produced by the periodic closing of these contacts are transmitted through the circuit of wire 22 to the indicating station B.

The arm 23 carries a retractable stop member 39, which is normally urged toward projected position but which is retracted by energizing the solenoid 40. When retracted member 39 permits arm 24 to pass the arm 23, to enable restoration of the apparatus after taking a reading. Retraction of member 39 also serves to operate a switch 41, which can be of the "micro" type. Another microswitch 42 is mounted upon arm 23, and its operating member 43 is located in a position to be engaged by the arm 24. Thus when arm 24 engages member 39, member 43 is likewise engaged to operate the microswitch 42.

In conjunction with the latch 27, there is a microswitch 44 which has its operating member 46 located above the latch, whereby when the latch is raised the switch 44 is operated. Another microswitch 47 is secured to a fixed support, and has its operating member 48 disposed to be engaged by the arm 24, when this arm is engaged by the latch and held in the position shown in Figure 1.

It may be explained that operation of switch 44 by raising the latch 27, serves to start the motor 29. Operation of switch 42 when the arm 24 reaches the member 39, serves to stop the motor. Operation of switch 41 when the member 39 is retracted serves to start the motor. Operation of switch 47 by the arm 24, when this arm is returned into engagement with latch 27, serves to stop the motor.

The electrical circuit connections can be as follows: Wire 22 is connected to one of the pulsing contacts 38, and the other of the pulsing contacts is grounded. One terminal of the solenoid 28 is connected to wire 22, and the other terminal is connected to latch 27. Arm 24 is connected to ground through suitable means such as the slip ring 51. Thus when the latch is engaged and in contact with the arm 24, the one side of the solenoid is grounded. One side of the solenoid 40 is grounded upon the arm 23, and the other terminal is connected through slip ring 52 with wire 53, which in turn connects to the wire 22.

The various starting and stopping switches for the motor 29 are connected as follows: One terminal of the switch 41 is grounded through the slip ring 56, and the other terminal connects through slip ring 57, with the start conductor 33. One terminal of switch 42 is grounded through slip ring 56, and the other terminal is connected through slip ring 58 with the stop conductor 34. One terminal of switch 44 is grounded and the other terminal is connected directly to conductor 33. One terminal of switch 47 is grounded and the other terminal is connected to stop conductor 34.

Operation of the apparatus A is as follows: When a starting current pulse of short duration is applied to line 22, solenoid 28 is energized to raise the latch 27. At that time it is assumed that the arm 23 is in a position corresponding to the pointer 17, and that this position indicates the level of liquid in the tank. Also it is assumed that as the liquid level increases, the angular relation between the arms 24 and 23 increases. When the latch 27 is raised, the circuit to ground through the solenoid 28 is interrupted, and the switch 44 is operated to start the motor 29 in operation. Starting of motor 29 operates the pulsing wheel 36, whereby the line 22 is periodically connected to ground. Assuming that the remote reading end of the line 22 is connected to a grounded source of current, it will be evident that this provides pulses for operating the indicating apparatus at the remote reading station.

As the motor 29 continues to operate the arm 24 is advanced toward the arm 23 until it engages the member 39. Simultaneously with such engagement the switch 42 is operated to stop further operation of the motor 29. Assuming use of proper means at the reading station which is responsive to the number of pulses received, it will be evident that means at the reading station can be moved a predetermined distance depending upon the pulses received, and that this distance serves to indicate the level of the liquid. The system is now locked out and no further pulses are transmitted. In order to restore the apparatus A to its original condition, a separate restoring pulse is applied to the line 22, and this pulse operates the solenoid 40 to retract the member 39, thus enabling the arm 24 to move past the same. In addition when the solenoid 40 is energized, switch 41 is operated to start the motor 29, whereby the arm 24 is moved until it comes to rest against the latch 27. At that time switch 47 is operated to stop the motor 29.

The reading station B includes means which is responsive to the number of pulses transmitted from the station A to secure a desired indication, and in addition it is provided with a switch which is operable to transmit starting and restoring pulses.

The pulse responsive means incorporated at the reading station consists in this instance of a ratchet wheel 61, the shaft of which is connected to the pointer 62. Suitable means serves to urge the wheel 61 in one direction (counter-clockwise as viewed in Figure 1) which can consist of a tension spring 63 attached to the cord 64. The cord is wrapped about and secured to the drum 66, the latter being attached to the ratchet wheel 61. The teeth of the ratchet wheel 61 are engaged by the pawl 67, which in turn has a pivotal connection 68 with the pivoted arm 69. Arm 69 is moved in one direction by energizing the solenoid or electromagnet 71, and returns to its original position under the tension of spring 72. This spring also serves to urge the pawl 67 against the teeth of wheel 61. A second retaining pawl 73 engages the teeth of wheel 61 to prevent back rotation. Pawl 73 can be disengaged with respect to the ratchet wheel by energizing the electromagnet 74. When the pawl is moved to disengaged position, it engages and lifts the lug 76 on the pawl 67, thus causing both pawls to be disengaged to cause return of the ratchet wheel to original position. The starting position of the ratchet is fixed by a stationary stop or abutment 77, which is engaged by the stop pin 78 on the wheel 61.

The switch S, which is associated with the indicating means just described, is shown provided with four sets of contacts numbered 1, 2, 3 and 4. The operating member of each set of contacts is preferably associated with a common operating member 81, which can be reciprocated either manually or by suitable motive means between its various operating positions. For the position illustrated in Figure 1, contacts 1, 2 and 4 are open, and contacts 3 are closed.

The electrical wiring at the reading station can be as follows: One side of the battery or like current source 82 is grounded, and the other side is connected to one of the contacts of the contact sets 1 and 4. Line 22 which extends from the tank station is connected to one of the contacts of each of the one contact sets 2 and 3. Electromagnet 71 has its one terminal grounded through the battery or other current source 70, and its other terminal connected by conductor 83 with one of the contacts of the contact set 2. The electromagnet 74 has its one side grounded, and its other side connected by conductor 84 with one contact of set 4. The other contact of this set is connected to the battery 82. Member 81 can be retained in various operating positions by the three position detent 86.

Operation of the entire system can now be described as follows: Assuming that the switch S is in the position shown in Figure 1, then the ratchet wheel 61 is as illustrated, and the pointer 62 is in zero or starting position. When one desires to secure an indication of the liquid level, switch operator 81 is moved to the right. During the initial part of this movement contact set 1 is closed before set 3 is opened, and at the same instant contact sets 2 and 4 remain open. This serves to complete a circuit through the line 22 to apply a starting pulse of short duration to the solenoid 28. The circuit that is completed is from battery 82 through contact sets 1 and 3, line 22, solenoid 28, latch 27, arm 24, and from thence to ground through the slip ring 51. Continued movement of member 81 to the right serves to close contact 2 and open set 3. Closing of contacts 2 serves to directly connect line 22 with line 83, and thus the subsequent pulses generated at the station A are applied to the magnet 71. Note that the pulsing circuit can be traced from battery 70, electromagnet 71, contacts 2, line 22, and pulsing contacts 38 to ground. While the switch S is held in the operating position just described, as by means of the detent 86, the pulsing wheel 36 revolves at the tank station in conjunction with operation of the motor 29 and rotation of the arm 24 as previously described. The train of the transmitted pulses is completed when arm 24 comes to rest upon member 39. The train of pulses operate the electromagnet 71 and pawl 67 to step the ratchet wheel 61 angular increments corresponding to the increments of movement of the arm 24. At the end of the train of pulses the ratchet wheel 61 and arm 62 are in a position corresponding to the arms 23 and 24, or in other words the pointer 62 properly indicates the level of the liquid in the tank.

In order to restore the apparatus at the tank station to its original condition, the switch operating member 81 is moved to its other limiting position. During the initial part of such movement contacts 2 are first opened, after which contacts 3 are closed, while the contacts 1 still remain closed. For the short interval that the two sets of contacts 1 and 3 are closed, a pulse is transmitted to the tank station A, over the line 22, which energizes the solenoid 40 to retract the member 39. Simultaneously the motor 29 is started in operation as previously described, whereby the arm 21 is restored to its original position. Switch operating member 81 is moved to its extreme left position, immediately after the restoring pulse is transmitted, and before the arm 24 has been moved to its initial position. In its extreme left hand position, contacts 3 and 4 are closed. The closing of contacts 4 completes a circuit from battery 82 through the electromagnet 74, whereby both the pawls 67 and 73 are lifted to release the ratchet wheel 61, thus permitting this ratchet wheel together with pointer 62 to return to original zero position. After the restoring operations just described the switch member 81 can be returned to its original intermediate position.

It will be evident from the foregoing that the system described above makes possible accurate positioning of an indicating member at a reading station by the use of a single wire connecting the tank and reading stations. The pulses can be transmitted at a regular rate commensurate with design of reliable apparatus which is positioned by the pulses at the reading station. The currents to be applied to line 22 need not be excessive, and therefore the system is effective over considerable distances.

Figure 2 illustrates another embodiment of the system in which electronic amplifying means is employed to make possible greater operating distances between the tank and reading stations. Thus an amplifying tube 91 is provided, having cathode, plate and control grid elements. The cathode is connected to the suppressor grid and is grounded. The plate is connected to conductor 92, leading to one terminal of the magnet 71. The other terminal of this electromagnet is connected by conductor 93 to the positive side of the direct current filter 94. This filter is connected by conductor 96 to the electronic rectifier 97, which includes a double rectifying tube 98, and the power supply transformer 99. The negative side of this transformer is connected by wire 100 to one contact of the contact set 1. Series resistors 101, 102 and 103 connect from conductor 96 to the control grid of tube 91, and resistor 103 is adjustable to provide the desired degree of sensitivity. The point of connection between resistors 102 and 103 is connected by conductor 104 to one of the contacts of contact set 2, and corresponds to the lead 83 of Figure 1. By-pass condenser 106 connects between lead 104 and ground, and condenser 107 from the point of connection between resistors 101 and 102, to ground. Resistor 108 provides a direct current by-pass across the winding of electromagnet 71.

With the embodiment of Figure 2 the operation is substantially the same as Figure 1. When the two sets of contacts 1 and 3 are momentarily closed as member 81 is moved to the right, a starting pulse is applied to line 22 from the rectifier 97. When the contact sets 1 and 2 are closed, with the member 81 in its extreme right hand limiting position, and with contacts 3 and 4 open, periodic grounding of line 22 at the tank station by the closing of the pulsing contacts 38 changes the voltage upon the control grid of tube 91, and this causes amplified current pulses to be applied to the electromagnet 71 to operate the ratchet wheel 61.

In the foregoing embodiments of the invention one line connects the tank and reading stations for an installation having one set of pulsing contacts. In the event an additional indication is desired, as for example to indicate the position of the second indicating pointer 18, then duplicate equipment can be employed for this purpose. Where it is desired to provide one reading station which can be selectively applied to any one of a plurality of tank stations, suitable selective switching means can be employed, as for example switching means of the automatic dialing type.

It is also possible to employ one line for two indications by the use of polarized pulses, as schematically illustrated in Figure 3. In this instance two control switches Sa and Sb are provided, with each switch being provided with three sets of contacts, 1, 2 and 3. These sets of contacts correspond to 1, 2 and 3 of Figure 1. The batteries 70a and 70b, and the windings 71a and 71b, correspond to the battery 70 and the winding of electromagnet 71, in Figure 1. Line 22 extends from both switches Sa and Sb to the tank station, where the line connects to one side of the polarized electromagnet 28a. The other terminal of this polarized electromagnet connects with the latch 27a, which corresponds to the latch 27 of Figure 1, and which engages the arm 24a. One terminal of the polarized electromagnet 28b connects to the arm 24a, and the other terminal connects with the latch 27b, which engages with the arm 24b. Arms 23a and 23b, corresponding to arm 23, connect respectively to one terminal each of the solenoids 40a and 40b, and the other terminals of these solenoids connect to line 22. Each of the arms 23a and 23b can be substantially in accordance with Figure 1, and adapted to arrest the associated arms 24a or 24b, until released by energizing the solenoids 40a and 40b. Each arms 24a and 24b is associated with the pulsing wheels 36a and 36b, and these wheels operate the corresponding pulsing contacts 38a and 38b. In Figure 3 the mechanical connecting means between the pulsing wheels and the arms 24a and 24b, and also the connection to the driving motor 28 and its control means, have been omitted.

The batteries 70a and 70b are connected to apply opposite polarities to the line 22. Therefore when switch Sa is operated to apply a starting pulse to line 22, this pulse will be say positive to ground, whereby it operates the electromagnet 28a, but not the magnet 28b. Following transmission of such a starting pulse, the wheel 36a is operated at the tank station to apply pulses to the line 22 and to the reading station, to operate indicating means similar to that illustrated in Figure 1. After obtaining a reading a restoring pulse can be applied to the line 22 by operating switch Sa, in the same manner as previously described. After operating switch Sa, switch Sb can be operated to apply a starting pulse to line 22 of opposite polarity. This serves to operate the magnet 28b, thus releasing arm 24b, and operating the pulsing wheel 36b to apply pulses to the indicating means at the reading station. Arms 24a and 24b may be connected to separate liquid level indicating means, to thereby indicate the liquid level in two separate tanks. It is also possible however that one mechanism may serve to indicate the level of liquid in units of say feet, and the other mechanism associated with an inches indicator. Here again suitable switching means can be provided whereby the apparatus at the reading station can be selectively connected to a plurality of tanks.

It will be evident that the apparatus can be modified in various ways. For example, the sequential switch S can be operated by a solenoid or like motive means, for local or remote operation, or its various contacts can be embodied in relay switches controlled by circuit means, with the circuit means in turn controlled by manual or relay contacts.

I claim:

1. In a system of the character described, a sending station and a receiving station, circuit means including a single conductor interconnecting said stations, an element at said sending station arranged to be displaced from a base position in accordance with a variable quantity, a first member at said sending station arranged to be displaced a distance proportional to the displacement of said element, a movable second member at said sending station cooperating with said first member, pulsing contacts at said sending station and in said circuit means, motive means for moving said second member from a starting position and operating said pulsing contacts in synchronism therewith to generate a number of pulses in said circuit means proportional to the displacement of said second member, stopping means on said first member engageable by said second member when it reaches a position corresponding to the position of the first member for stopping said motive means and thereby terminates said pulses, an indicating member at said receiving station movable from an initial position to a position to indicate the displacement of said element, means at the receiving station responsive to said pulses to so position said indicating member, selectively operable means at said receiving station operable to start said motive means when said second member is in its starting position, operable to initiate return of said second member from said stopping means to said starting position, and operable to reset said indicating member to its initial position, and means for stopping said second member at its starting position.

2. In a system of the character described, a sending station and a receiving station, a single electrical circuit including a conductor connecting said stations, a movable element at said sending station for indicating a variable quantity, generating means at said sending station for generating a number of pulses proportional to the displacement of said element and transmitting said pulses over said conductor, responding means at said receiving station responsive to said pulses for producing an indication of the position of said element, a pulse responsive device at said sending station for initiating operation of said pulse generating means, said responding means including means for resetting the same, and control means at said receiving station selectively operable to disconnect said responding means from said conductor and then transmit a pulse over said conductor to said pulse sending station to initiate operation of said generating means, operable to connect said responding means to said conductor for response to pulses from said generating means, and operable to reset said responding means.

References Cited in the file of this patent

UNITED STATES PATENTS

| | | |
|---|---|---|
| 1,955,043 | Yates et al. | April 17, 1934 |
| 2,168,149 | Arnold | Aug. 1, 1939 |
| 2,192,421 | Wallace | Mar. 4, 1940 |
| 2,479,704 | Stonor | Aug. 23, 1949 |
| 2,623,936 | Kennedy et al. | Dec. 30, 1952 |